United States Patent
Vilardell (10) Patent No.: US 12,389,917 B2
(45) Date of Patent: Aug. 19, 2025

(54) CARCASS STABILIZING SYSTEM

(71) Applicant: Equipements Frontmatec Inc., St-Anselme (CA)

(72) Inventor: Josep Serra Vilardell, Cardona-Barcelona (ES)

(73) Assignee: Equipements Frontmatec Inc., St-Anselme (CA)

( * ) Notice: Subject to any disclaimer, the term of this patent is extended or adjusted under 35 U.S.C. 154(b) by 301 days.

(21) Appl. No.: 17/955,852

(22) Filed: Sep. 29, 2022

(65) Prior Publication Data
US 2023/0098883 A1 Mar. 30, 2023

Related U.S. Application Data

(60) Provisional application No. 63/261,807, filed on Sep. 29, 2021.

(51) Int. Cl.
*A22C 17/00* (2006.01)
*B65G 47/22* (2006.01)
*F16F 9/02* (2006.01)

(52) U.S. Cl.
CPC .......... *A22C 17/0093* (2013.01); *B65G 47/22* (2013.01); *F16F 9/0218* (2013.01); *F16F 2222/126* (2013.01); *F16F 2232/08* (2013.01); *F16F 2234/02* (2013.01)

(58) Field of Classification Search
CPC ................................ A01K 97/10; B65G 47/22
USPC ........................................................ 452/177
See application file for complete search history.

(56) References Cited

U.S. PATENT DOCUMENTS

| | | | | |
|---|---|---|---|---|
| 3,412,424 A * | 11/1968 | Brown | ................. | A22C 17/004 452/138 |
| 4,189,806 A * | 2/1980 | Van Heyningen | ..... | A22C 17/12 452/134 |
| 5,076,417 A * | 12/1991 | Santicchi | ............... | B65G 47/61 198/465.4 |
| 5,135,101 A * | 8/1992 | Dudley | ................ | B65G 47/846 198/370.11 |
| 5,168,976 A * | 12/1992 | Kettelson | ............. | B23Q 16/008 193/35 A |
| 5,295,898 A * | 3/1994 | Andre | ................... | A22B 5/0005 452/134 |
| 6,699,116 B1 * | 3/2004 | Gasbarro | ............... | A22C 17/04 452/128 |
| 2005/0079815 A1 * | 4/2005 | Johnson | ............. | A22C 17/0093 452/150 |

(Continued)

*Primary Examiner* — Richard T Price, Jr.
(74) *Attorney, Agent, or Firm* — GableGotwals (57) ABSTRACT

A carcass stabilization system for a meat processing plant having carcasses transported along a processing line is provided. The system includes a stabilizer installed proximate the processing line and having a carcass engagement component and a shock absorbing device coupled to the carcass engagement component adapted to absorb at least some of the forces resulting from the carcasses impacting the carcass engagement component. The system also includes a stabilizing surface extending along the processing line opposite the stabilizer such that the carcasses are transported along the processing line between the stabilizing surface and the stabilizer, where the carcass engagement component is adapted to engage and bias the carcasses against the stabilizing surface.

17 Claims, 8 Drawing Sheets

(56) References Cited

U.S. PATENT DOCUMENTS

2009/0241472 A1\* 10/2009 Lindee .................. B65B 25/065
53/391

\* cited by examiner

CARCASS STABILIZING SYSTEM

CROSS-REFERENCE TO RELATED APPLICATIONS

This application claims priority under 35USC § 119(e) of U.S. Provisional Application No. 63/261,807, filed on Sep. 29, 2021, entitled "CARCASS STABILIZING SYSTEM", the entirety of which is hereby incorporated by reference.

TECHNICAL FIELD

The present disclosure generally relates to the field of product stabilization, and more particularly relates to carcass stabilization systems in various environments, such as in a meat processing plant.

BACKGROUND

Known meat processing plants, such as those processing pigs, can operate processing lines at a capacity of about 1,100 pigs per hour, or higher. In order to process at these rates, the main chain operates at a fast linear speed to transport the pig carcasses along the processing line. Typical processing lines are not a single straight line, and therefore include bends and/or changes in direction. These changes in direction provide momentum (e.g., centrifugal force) to the transported product, which results in the product swinging in place, such as pig carcasses swinging on their hooks. Products/carcasses hanging from a rail, such as when using a chain, hooks and/or gambrels, will move, swing, rotate, etc., while being transported in the process.

Traditional meat processing equipment relies on proper positioning of the carcasses in order to generate accurate cuts and/or operation. A swinging piece of meat can, for example, be misread by a vision system and cause a miscut. For non-vision-guided equipment, it can be required to add complicated devices to the processing line and/or the equipment in order to limit movement and stabilize the carcasses. Moreover, a swinging piece of meat can, for example, make it difficult for workers and/or machines to perform various tasks, such as cutting the carcass. Equipment using robots (automated or not) can hardly be fitted with integrated stabilization mechanisms as this renders the robots cumbersome, overly complicated, too heavy and/or costly to maintain. Known systems include a separate stabilization mechanism on the opposite side of the robot, making the overall solution require more control systems, more parts, and is generally more complex to troubleshoot, among other issues.

There is thus a need to continue innovating and finding better and/or different ways of manufacturing, assembling and/or operating devices and systems to improve various types of product processing by providing improved stabilization.

Indeed, it would be particularly advantageous to provide an apparatus and/or a system, such as a stabilizing system for assisting in reducing movement of carcasses being processed in a more efficient, more precise, more accurate, more reliable, more adjustable, more versatile, more adaptable, more ergonomic and/or more desirable manner, than what is possible with available products and devices.

Thus, it would be particularly useful to be able to provide such an improved system which would be able to overcome or at the very least minimize some of known drawbacks and/or deficiencies associated with conventional methods, systems and/or devices, for example.

SUMMARY

According to an aspect, a carcass stabilization system for a meat processing plant having carcasses transported along a processing line is provided. The carcass stabilization system includes a stabilizer installed proximate the processing line and comprising a carcass engagement component and a shock absorbing device coupled to the carcass engagement component adapted to absorb at least some of the forces resulting from the carcasses impacting the carcass engagement component; and a stabilizing surface extending along the processing line and provided opposite the stabilizer such that the carcasses are transported along the processing line between the stabilizing surface and the stabilizer, where the stabilizer is adapted to engage and bias the carcasses against the stabilizing surface.

According to another aspect, a stabilization system for a processing plant having products being transported along a processing line is provided. The stabilization system includes a stabilizer installed proximate the processing line and comprising a product engagement component and a shock absorbing device coupled to the product engagement component adapted to absorb at least some of the forces resulting from the products impacting the product engagement component; and a stabilizing surface extending along the processing line and provided opposite the stabilizer such that the products are transported along the processing line between the stabilizing surface and the stabilizer, where the stabilizer is adapted to engage and bias the products against the stabilizing surface.

DETAILED DESCRIPTION

As will be explained below in relation to various embodiments, the present disclosure described apparatuses, systems and methods for stabilizing items being conveyed, for example, as part of a processing line. More specifically, the present disclosure relates to a carcass stabilization system adapted to prevent, or at least reduce movement of carcasses (e.g., animal carcasses such as pigs) being conveyed and processed along a processing line of a slaughterhouse.

The stabilization system can include stabilizers adapted to interact with carcasses being conveyed, or otherwise transported, for example, on hooks or gambrels, and which are thereby prone to sway as they are moved along a processing line, to reduce movement of the carcasses on their respective hooks. The stabilizers can be installed along the processing line, such as proximate locations which can induce additional swinging (e.g., near corners or sharp turns of the processing line) and include one or more shock absorbers to have the carcasses abut thereon. The shock absorbers are adapted to absorb at least some of the forces from the impacting carcass, thereby reducing (or eliminating) the subsequent swinging motion of the carcass as it moves away from the stabilizers.

In one embodiment, the stabilization system includes a stabilizing surface provided opposite the stabilizers such that the carcasses are displaced along the processing line between the stabilizing surface and the stabilizers. Each shock absorber can include an engagement component, such as a belt or a plate, extending alongside the processing line and against which the carcasses can abut, and a shock absorbing device, such as a pneumatic cylinder, coupled to the plate and configured to generate/apply a substantially constant pressure on the plate. As such, the forces applied to the plate (e.g., from the swinging carcasses) are at least partially countered and/or absorbed by the shock absorbing device in order to reduce the subsequent swinging motion of the carcasses. Moreover, and as will be described further below, the pressure provided by the shock absorbing device on the plate can push and/or maintain the carcass in contact with the stabilizing surface to further reduce movement of the carcass. In some embodiments, the stabilizing surface includes a lateral conveyor configured to urge, or otherwise help the forward movement of the carcasses along the processing line as the carcasses are stabilized between the lateral conveyor and the shock absorbers.

The stabilizers can include a pair of shock absorbers installed adjacent one another along the processing line to define a dual-stage stabilization sequence. In this case, it is noted that the dual-stage stabilization sequence includes a first reduction of movement (e.g., from the first absorber) followed by a second reduction of movement (e.g., from the second absorber), although other configurations are possible and may be used, such as having the pair of shock absorbers positioned so as to engage the same carcass at substantially the same time, for example.

The stabilization system can thus be configured to provide more stable carcasses in processing lines of slaughterhouses, which can facilitate operations of machines further along the processing line, such as machines configured to cut the carcasses, for example. The stabilization system can accomplish these functions, among others, in a simpler, easier, faster, more accurate, more effective, more functional, more reliable and/or more versatile manner than what is possible with other conventional devices and/or apparatus.

Figure 1:
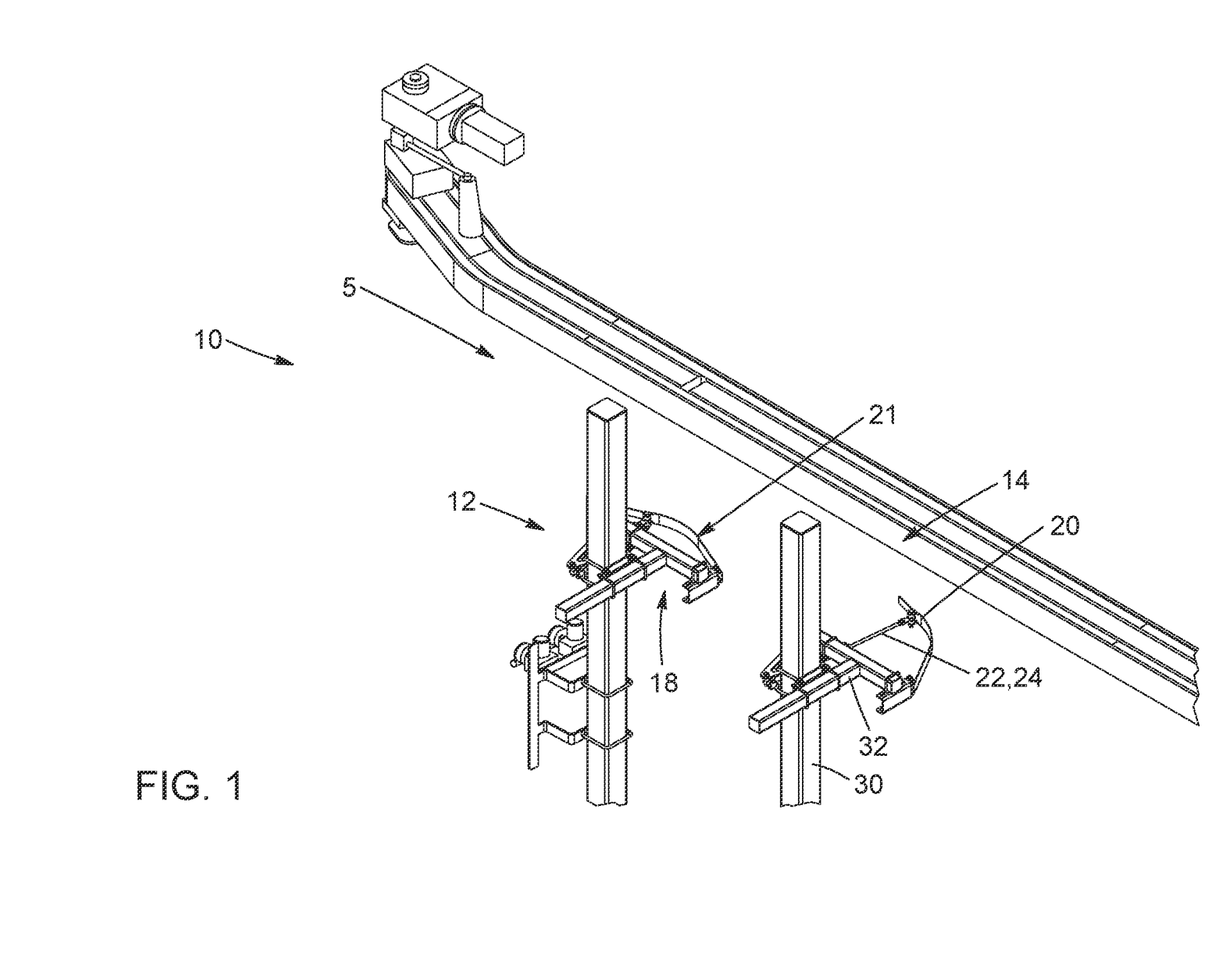
FIG. 1 is a perspective view of a stabilization system according to an embodiment, showing a pair of stabilizers and a conveyor mounted proximate a processing line.
Figure 2:
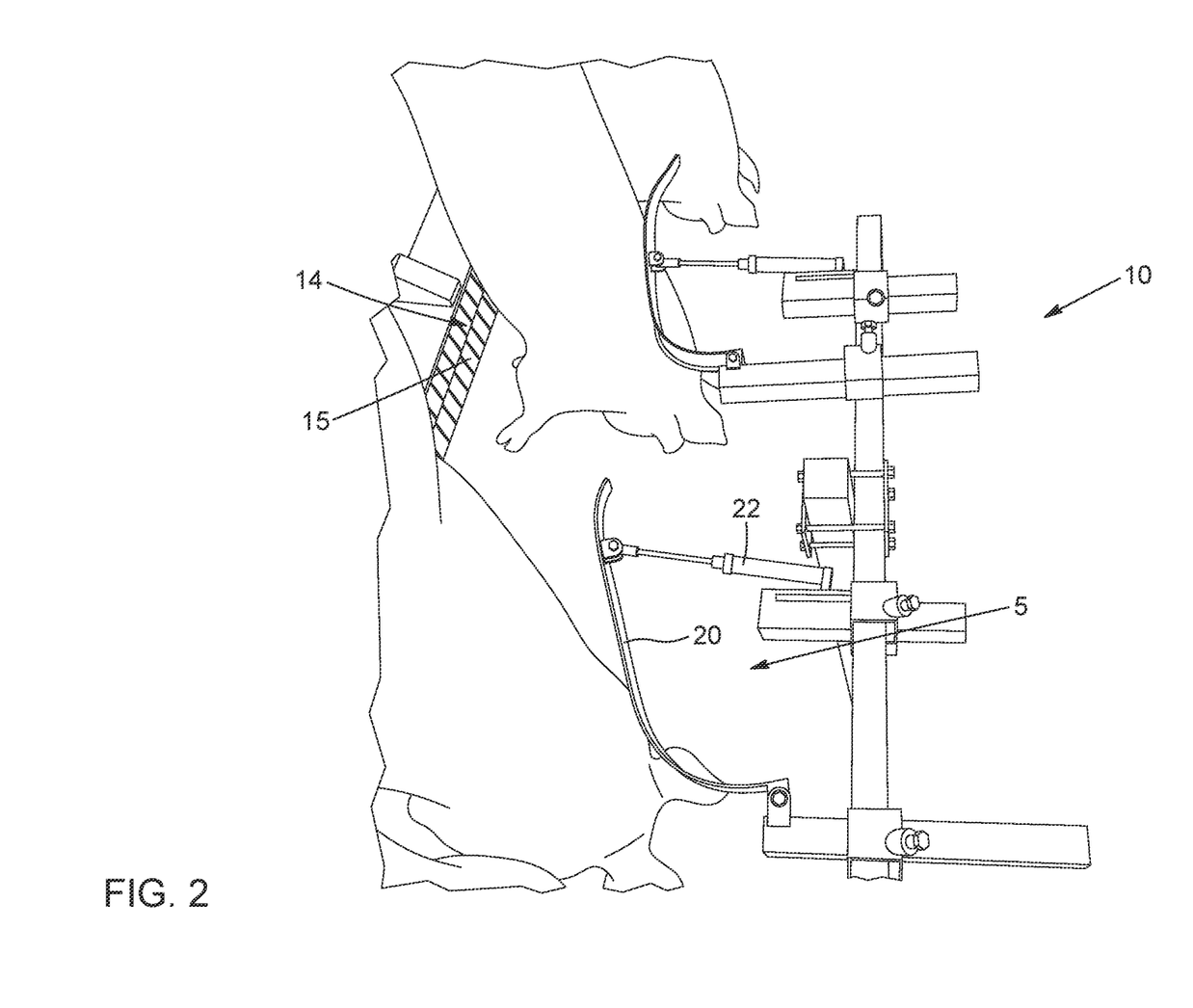
FIG. 2 is a top perspective view of the stabilization system shown in FIG. 1, showing animal carcasses being transported along the processing line and being engaged by the stabilizers, according to an embodiment.

With reference to FIGS. 1 and 2, a stabilization system 10 is shown according to an embodiment. In this embodiment, the stabilization system 10 can be installed along a processing line 5 of a factory, for example, and is configured to stabilize the product(s) being conveyed, carried or otherwise displaced along the processing line 5. In the context of the present disclosure, the product is an animal carcass, and the factory is a slaughterhouse such that the processing line includes animal carcasses hanging from hooks and being carried along a processing path. However, it should be noted that the stabilization system 10 can be used for other types of products and/or as part of other types of factories through which various products are conveyed (on hooks or not). For example, the stabilization system 10 can be used to stabilize products being conveyed along a conveyor belt.

It is noted that products (e.g., animal carcasses) hanging from hooks and/or transported on a chain are subject to certain undesired movements, such as swinging and/or rotational motion, as they are moved forward along the processing line. It should therefore be understood that the stabilization system 10 is adapted to prevent, or at least reduce, these undesired movements in order to provide a more stable product along the processing line.

Figure 3:
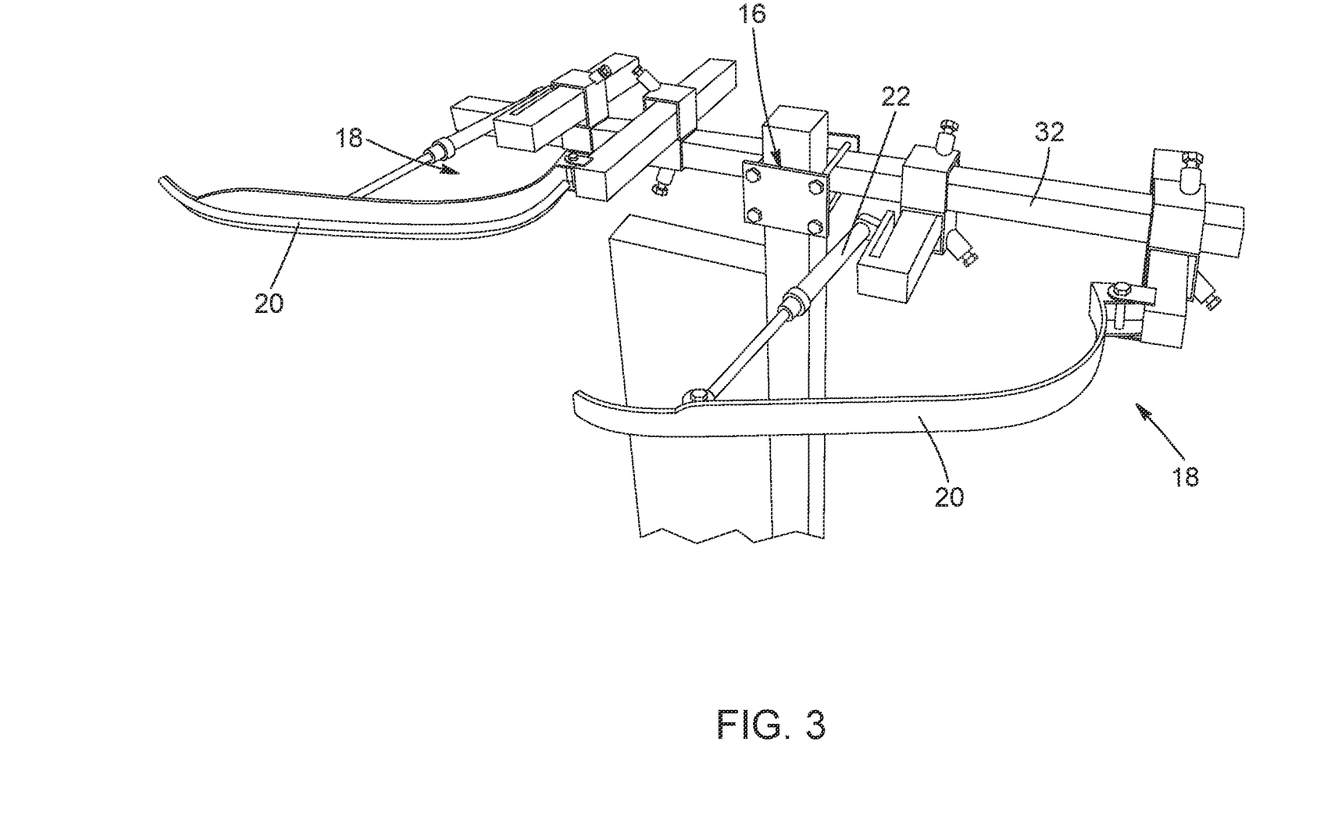
FIG. 3 is a front perspective view of the stabilization system shown in FIG. 1, showing each stabilizer having a plate extending forward and adapted to engage transported carcasses, according to an embodiment.
Figure 4:
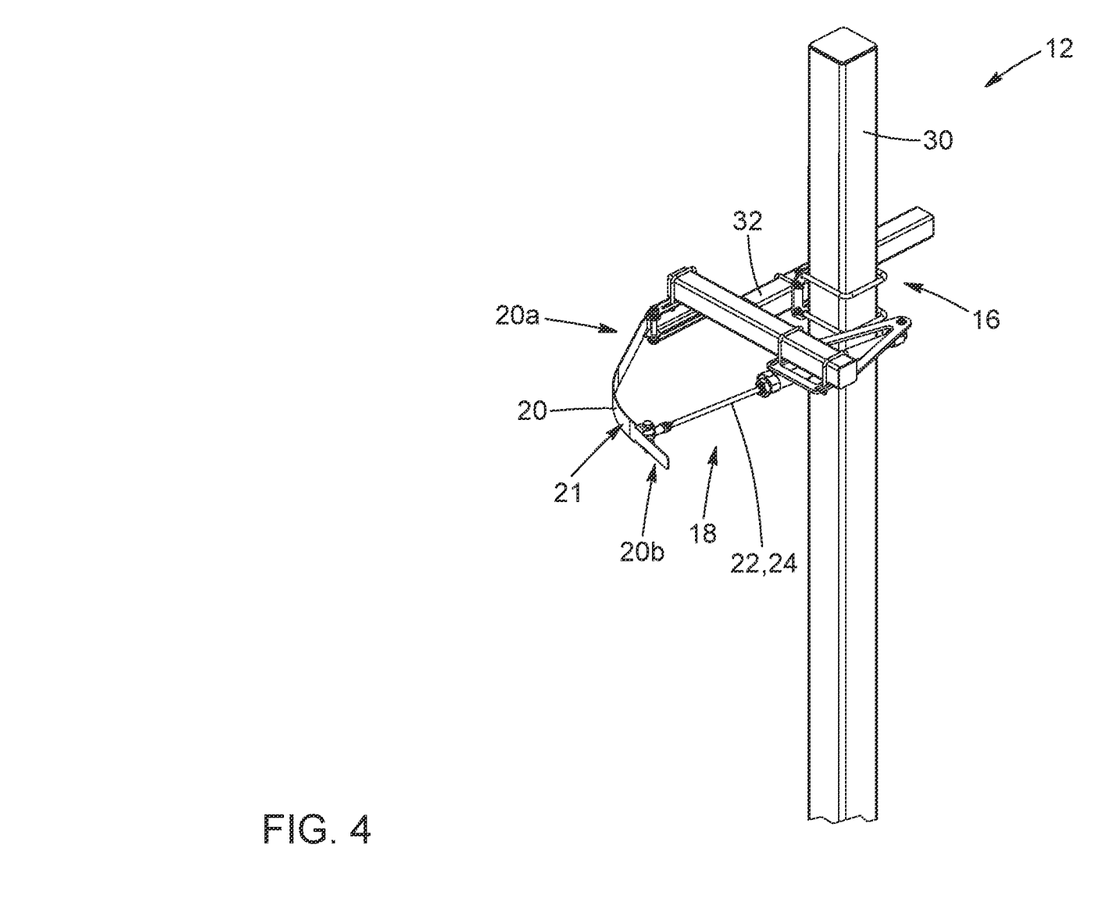
FIG. 4 is a perspective view of a stabilizer of the stabilization system shown in FIG. 1, showing a shock absorber coupled to the plate, according to an embodiment.

With reference to FIGS. 3 and 4, in addition to FIGS. 1 and 2, the stabilization system 10 includes one or more stabilizing tools, or "stabilizers" 12 operable to engage the carcasses to reduce movement thereof on their hooks (e.g., reduce swinging). The stabilization system 10 further includes a stabilizing surface 14 installed opposite the one or more stabilizers 12 such that the carcasses are carried along the processing line between the stabilizing surface 14 and the stabilizer(s) 12. The carcasses can contact the stabilizers 12 on a first side of the processing line, and the stabilizing surface 14 on the opposite side of the processing line. Therefore, it is noted that movement in a direction generally perpendicular to the processing line is prevented due to the presence of the stabilization system 10 components.

In some embodiments, the stabilizer 12 includes a support member 16 provided proximate the processing line 5, and a shock absorber 18 coupled to the support member 16. The shock absorber 18 is adapted to absorb at least some of the forces generated from moving (e.g., swinging) carcasses which engage or otherwise come into contact with the stabilizers 12. It should be understood that absorbing at least some of the forces can facilitate stabilizing the carcass since the swinging motion of the carcass is reduced after having engaged the stabilizer 12. In this embodiment, the shock absorber 18 includes a plate 20 having an engagement surface 21, and a shock absorbing device 22 operatively coupled to the plate 20. During operation, the carcasses are carried along the processing line and engage (e.g., impact) the engagement surface 21, with the shock absorbing device 22 being configured to absorb at least some of the forces from the contact/impact.

In some embodiments, the shock absorbing device 22 is configured to generate a generally constant pressure on the plate 20 to maintain the plate in a predetermined position. The shock absorbing device 22 can also enable movement of the plate 20, such as when the forces from the impact of the carcass on the engagement surface 21 (i.e., on the plate 20) are greater than the pressure generated by the shock absorbing device 22. As such, the initial impact of the carcass against the engagement surface 21 can displace the plate 20 in a corresponding and/or predetermined direction, and the shock absorbing device 22 subsequently reverts the plate in its initial position (e.g., the predetermined position) via the pressure being applied to the plate. As seen in FIGS. 1 and 2, the predetermined position of the plates 20 can include positioning the plates 20 at a predetermined distance from the stabilizing surface 14 such that the carcasses engage the plates 20, the stabilizing surface 14 or both.

In this embodiment, the shock absorbing device 22 includes a pneumatic cylinder 24 having a retractable rod configured to apply the pressure on the plate 20, and retract into a cylinder housing when the forces applied on the engagement surface 21 (e.g., from carcass impacts) are greater than the generated pressure. It is appreciated that other configurations and/or devices are possible and may be used to generate a substantially constant pressure on the plate 20. For example, the stabilizers can alternatively, or additionally, include devices such as spring(s), servo motor-driven mechanism(s), or any combination thereof to generate pressure or apply a force on the plate 20. It should also be noted that, in some embodiments, the stabilizers 12 can have no shock absorbing device coupled to the plate 20, in which case the plate would be shaped, sized, positioned and/or made of resilient material adapted to keep its shape and generally maintain its position on the processing line. It is thus noted that, in some embodiments, the shape, size, position and/or material of the plate can be adapted to absorb some of the forces from impacting carcasses, and can therefore assist the shock absorbing device 22 in stabilizing the carcasses.

Still with reference to FIGS. 1 to 4, the plate 20 of the stabilizer 12 can be arcuate, straight, or a combination thereof. In this embodiment, the plate 20 can have an elongated shape (similar to a belt or a strip) having a proximal end 20a connected to the support member 16, and a distal end 20b extending forwardly from the support member 16 and being coupled to the shock absorbing device 22 (e.g., to the retractable rod of the pneumatic cylinder 24). The plate 20 can have a portion thereof (e.g., a proximal portion) be arcuate to enable the plate to extend from the support member 16 and position its distal end 20b in front and in a spaced-apart manner relative to the support member 16. The plate can have another portion thereof (e.g., a distal portion) be relatively straight, such as substantially parallel to the direction of the processing line, for example.

The plate can alternatively be misaligned with the direction of the processing line, such as being diagonal or the like, which can apply pressure progressively along the carcass and/or adapt to varying carcass lengths. It should be noted that, as used herein, the expression "apply pressure progressively" can refer to the configuration of the plate enabling the application of incremental forces or pressure on the carcass when it engages the plate as the carcass passes by the stabilization system. The incremental force can increase or decrease as the carcass moves (e.g., slides) along the plate 20, as required.

The engagement surface 21 of the plate 20 can be defined across the proximal portion, the distal portion, or both (i.e., across the entire outer surface of the plate). It is appreciated that an arcuate shape can provide a "spring" effect to the carcasses impacting on the plates 20, such that the geometry/configuration of the plates can assist in absorbing some of the impact forces.

As seen in FIG. 4, the plate 20 can be generally flat, although other configurations are possible. The plate 20 can be made of any suitable material, such as a metallic material, a resilient material and/or a plastic, for example. In some embodiments, the engagement surface 21 can be smooth (e.g., no bumps or protrusions) such that the carcasses can impact the engagement surface 21 and slide along the length of the surface and off the plate 20. In other embodiments, the engagement surface 21 can be adapted to at least partially grip onto the carcasses, for example, to stop a forward swinging motion. In such embodiments, the engagement surface 21 can be provided with a "sandpaper-like" texture along a portion of or the entire surface area of the engagement surface. Any other suitable configuration and/or texture of the engagement surface 21 can alternatively, or additionally be used. For example, the engagement surface can have at least a portion thereof with a cone top configuration, a nub top configuration, a diamond plate, a ribbed configuration, etc.

In some embodiments, the stabilizers 12 can have other absorbing plate designs (e.g., other than the generally flat or smooth curved steel plate), such as rollers, round bar(s), curved round bar(s), small conveyor(s), resilient components, etc. As will be described further below, multiple stabilizers can be installed proximate one another along the processing line, and each stabilizer can have the same configuration or respective configurations, with their own absorbing plate and/or shock absorption configuration.

In some embodiments, the support member 16 includes a post 30 installed proximate (e.g., adjacent) the processing line, and a support frame 32 connected to the post 30. The plate 20 and the shock absorbing device 22 can be coupled to the support frame 32, which is in turn adjustably connected to the post 30. The position of the support frame 32 relative to the post 30 can therefore be adjusted, which correspondingly adjusts the position of the plate 20 and the shock absorbing device 22. For example, the support frame 32 can move up and down the post 30 to enable positioning the plate at desired heights (e.g., to have specific parts of a carcass engage the plate), perpendicularly relative to the post (e.g., move left or right), tilt in one or more directions, pivot about the post 30, etc. Having an adjustable support frame 32 can facilitate fine tuning the stabilizers to increase efficiency thereof, for example.

Figure 5:
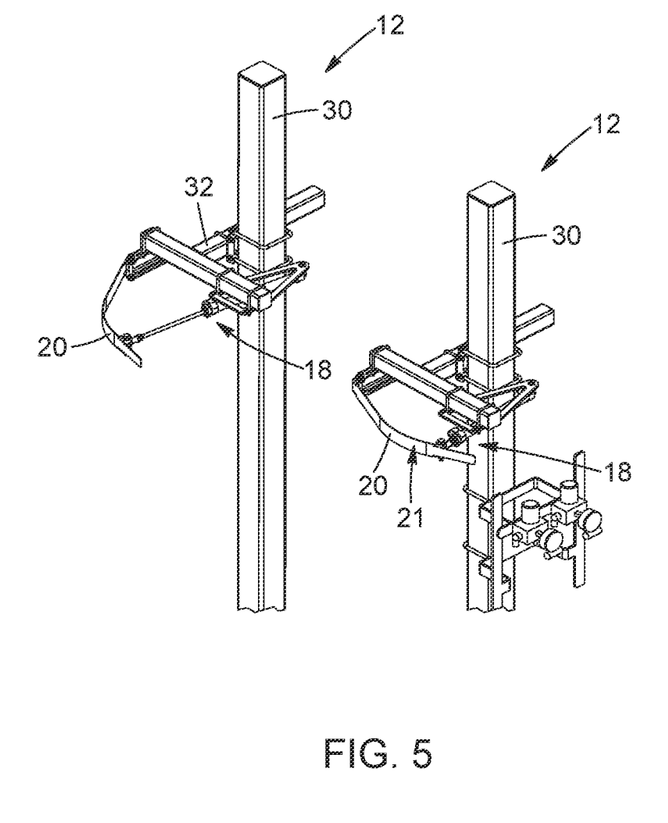
FIGS. 5 and 6 are perspective views of alternate embodiments of the stabilizers of the stabilization system, showing different configurations of the plates and shock absorbers.
Figure 6:
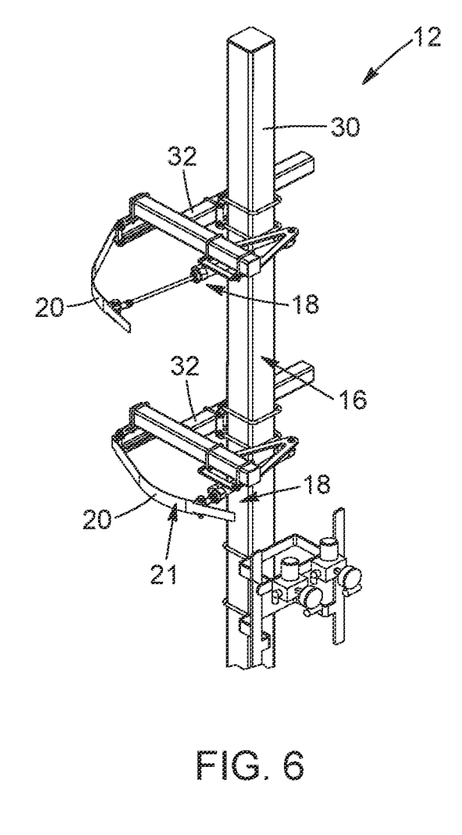

With reference to FIGS. 5 and 6, the stabilization system 10 can include a plurality of stabilizers 12 installed proximate one another along the processing line. For example, the stabilizers 12 can be mounted subsequently (one after the other) along the processing line, for example, at generally the same height or at varying heights (seen in FIGS. 2, 3 and 5). Some stabilizers can alternatively, or additionally, be at the same location but positioned at varying heights (seen in FIG. 6). In the embodiment of FIG. 5, the stabilizers 12 define a dual-staged stabilization system, where, as the swinging carcasses comes down the processing line, the first stabilizer will engage with the carcasses (e.g., the swinging carcasses impact against the first stabilizer), while the stabilizing surface 14 provides a stable surface against which the carcasses are pressed (e.g., via the plate and pneumatic cylinder). The initial contact of the carcass against the plate can displace the absorber by pushing the retractable rod into the cylinder housing, but because of the configuration of the pneumatic cylinder, the constant pressure generated pushes the carcass back toward and against the stabilizing surface.

Once the carcass moves past and disengages the first stabilizer, the carcass engages with the second stabilizer which also pushes on the carcass toward the stabilizing surface. This second push further stabilizes the carcass by reducing the swinging movement thereof. The stabilizers 12 can include respective shock absorbers 18 having the same configuration or respective configurations. In some embodiments, the first stabilizer can be configured to absorb higher forces than the second stabilizer. For example, the first stabilizer can be adapted to generate greater pressures than the second stabilizer. Moreover, the plate of the first stabilizer 12 can be more flexible than the plate of the second stabilizer to compensate for higher force impacts, whereas the second plate can be more rigid since the impacts on the second shock absorber 18 can generate less force than on the first shock absorber 18.

In some embodiments, the stabilizing surface 14 can run parallel to the processing line and facilitate movement of the carcasses along said processing line. For example, the stabilizing surface 14 can include a lateral conveyor 15, as seen in FIGS. 1 and 2, operable to move the carcasses along the processing line. It should be noted that the carcasses are hanging from chains/hooks which transport the carcasses along the processing line. As the hooks transport the carcasses down the processing line, the stabilizers are adapted to push the carcasses against the lateral conveyor which assists in displacing the carcasses in the direction of the hooks (i.e., in the direction of the processing line). It should be understood that the conveyor includes a conveyor belt configured to urge the carcasses along the processing line.

The conveyor belt can be installed opposite the stabilizers at any suitable height. For example, the conveyor belt can be positioned at a hind leg level, for example. It is noted that the conveyor can be adjustable in order to selectively position the conveyor belt at a desired vertical level relative to the stabilizers and/or the processed animal carcasses. In some embodiments, the stabilization system 10 can include stabilizing devices positioned opposite the stabilizers 12 in addition to, or instead of the conveyor 15. For example, stabilization system 10 can include a first conveyor on the breast or bottom part of hanging carcasses, while a second conveyor could be used to stabilize the gambrels in the leg area or upper part of the hanging carcasses.

In some embodiments, the stabilizers are installed at various locations along a processing line of a factory or slaughterhouse. For instance, it can be desirable to stabilize the products (e.g., the carcasses) prior to moving them to be processed by manual and/or automated operations. Operations such as cuts using machines like a neck clipper, belly/breast bone opener, bunger, leaf lard puller, backfinner, back splitter, leg cutter, etc., or other tasks such as a carcass printer can be performed in quick succession from one carcass to another. It is appreciated that a part that is moving/swinging continuously in a non-predictive and/or non-constant fashion can be challenging to cut in the desired manner. Depending on the operation, movement of the carcasses can cause a miscut resulting in contamination and possible meat loss or downgrade. Although known devices can achieve an acceptable level of cut quality/accuracy while the carcasses are moved, they are not adapted to cut a carcass that moves and rotates/swings at the same time, which can result in damage to meat parts, tool breakage, etc. For instance, computer-implemented programs, vision systems (e.g., X-rays), control systems for robots, etc., are less efficient and/or more complicated to operate, especially in real-time, when carcasses are moving, swinging and/or rotating.

Figure 7:
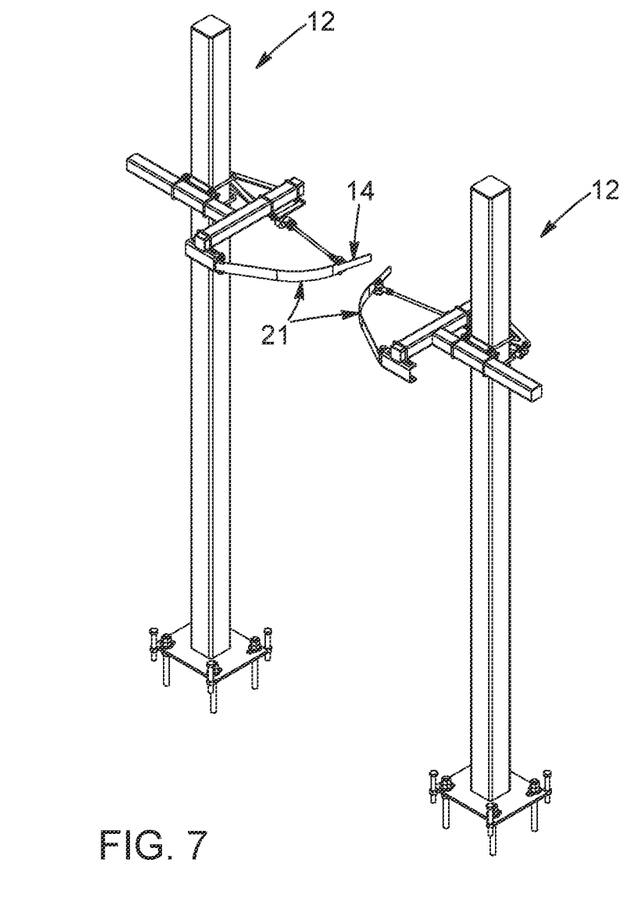
FIGS. 7 and 8 are perspective views of alternate embodiments of the stabilization system, showing one or more stabilizers mounted opposite one another to stabilize carcasses on either side thereof.
Figure 8:
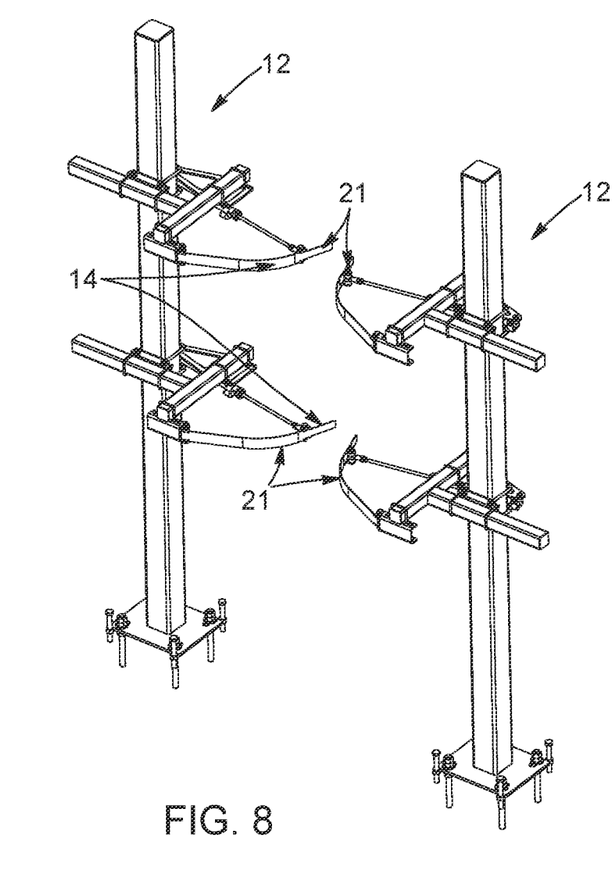

Alternatively, and as seen in FIGS. 7 and 8, the stabilization system 10 can include at least one pair of stabilizers 12 (e.g., secondary stabilizers 12) installed opposite one another across the processing line, for example, so as to have one or more stabilizers on each side of the moving carcasses. The stabilizers 12 can be installed directly in front of one another to stabilize the carcass simultaneously, or staggered along the processing line to stabilize the carcass in quick succession. It should thus be noted that, in such embodiments, the stabilizing surface 14 can correspond to the engagement surface 21 of at least one of the stabilizers installed opposite the processing line.

Similarly, vision systems or measuring systems, such as scanners and x-ray machines, can be improved by previously stabilizing the product to be scanned. For example, a stable animal carcass can be more accurately measured and evaluated when compared to a swinging, moving and/or rotating carcass. Manual labor can also be improved by stabilizing the carcasses, where excessive movement or momentum of the carcasses can cause issues for workers.

It should be appreciated from the present disclosure that the various embodiments of the stabilization system 10 therefore provide several advantages over conventional systems, devices and/or apparatus in that: a) it facilitates cooperative work between machines and humans by providing a stable product/work surface; b) it facilitates operation of vision systems and measurements of the product; c) it can be adapted for products of varying shapes, sizes and from different industries; d) it facilitates automated and/or manual operations performed on the product along the processing line, which leads to end products of higher quality; e) it facilitates automated and/or manual operations performed on the product along the processing line, which leads to less damage to the equipment and/or to the product; f) it facilitates automated and/or manual operations performed on the product along the processing line, which leads to less loss of product (accidental or not); g) reducing swinging and/or rotational movement of the transported product enables operation of processing lines at higher speeds (e.g., more products per hour moving along the processing line); h) etc.

As may now be better appreciated, the stabilization system 10 of the present disclosure can be advantageous in that it provides a system capable of stabilizing various products on a processing line in a more efficient, more precise, more accurate, more reliable, more adjustable, more versatile, more adaptable, more ergonomic and/or more desirable manner, than what is possible with other existing conventional devices.

The described example embodiments are to be considered in all respects as being only illustrative and not restrictive. For example, in the embodiments illustrated in the accompanying drawings, the product being stabilized by the stabilization system consists of pig carcasses. However, it is noted that other types of carcasses can be used, such as cattle, lamb or chicken, or any other suitable product which includes parts hanging from chains and/or hooks along a processing line, and which requires stabilization. The stabilization system can also be used in various processing areas of a meat processing plant such as cut floors, fabrication floors and/or deboning rooms where a part has excessive or undesired movement and requires stabilization. For example, the loin drop operation (i.e., the cut between round and sirloin) is performed in cattle fabrication rooms and may require stabilization for an accurate cut. The processing lines for the round and the chuck cuts are also examples of products that could require stabilization. In pork cut or deboning floors, stabilization could be required for hanging shoulder deboning as well as hanging ham deboning.

In other example embodiments, the stabilization system can include multiple absorbing stages, for example, with three (3) or more stabilizers installed in a row which could allow more force absorption efficiency. The stabilization system can be configured with stabilizers and/or shock absorbers at different heights (at the same location, or staggered along the processing line) in order to contact and press specific parts of a given carcass, or enable contacting and pressing different sizes/types of carcasses, or both. The stabilization system can be configured with dynamic pressure absorbing units. More specifically, instead of using a constant pressure with every plate, each unit could have a lower pressure for the initial contact of the carcass, which would increase for the second phase of contact, and so on.

Alternatively, the stabilization system can be configured with different constant pressures at each stabilizer in order to progressively stabilize the carcass at it is transported past the stabilizers. In another embodiment, the stabilizers are provided with a single elongated plate, but includes a plurality of shock absorbing devices coupled to the plate and spaced along a length thereof.

Figure 9:
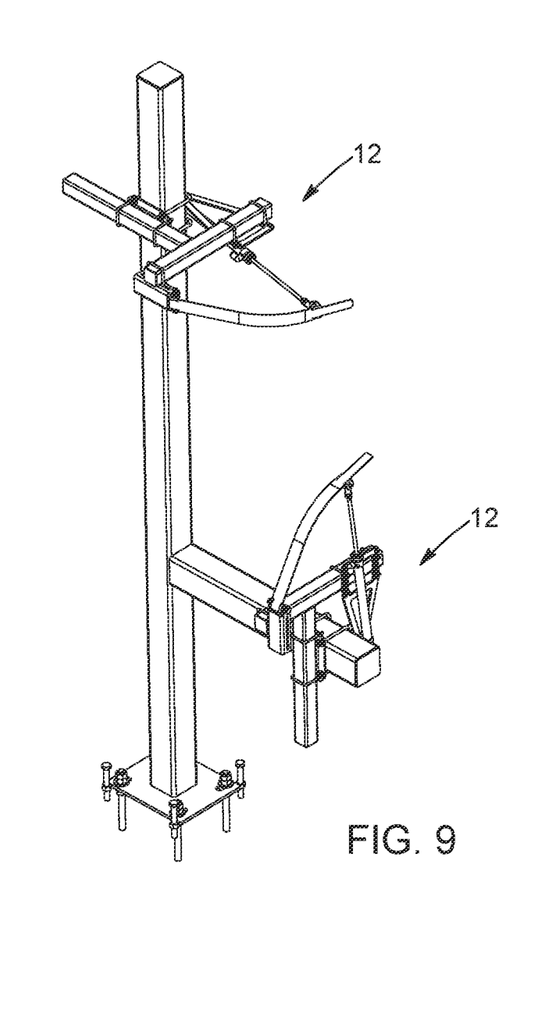
FIGS. 9 and 10 are perspective view of an alternate embodiment of the stabilization system, showing at least a second stabilizer adapted to stabilize a carcass along a different axis relative to a first stabilizer.
Figure 10:
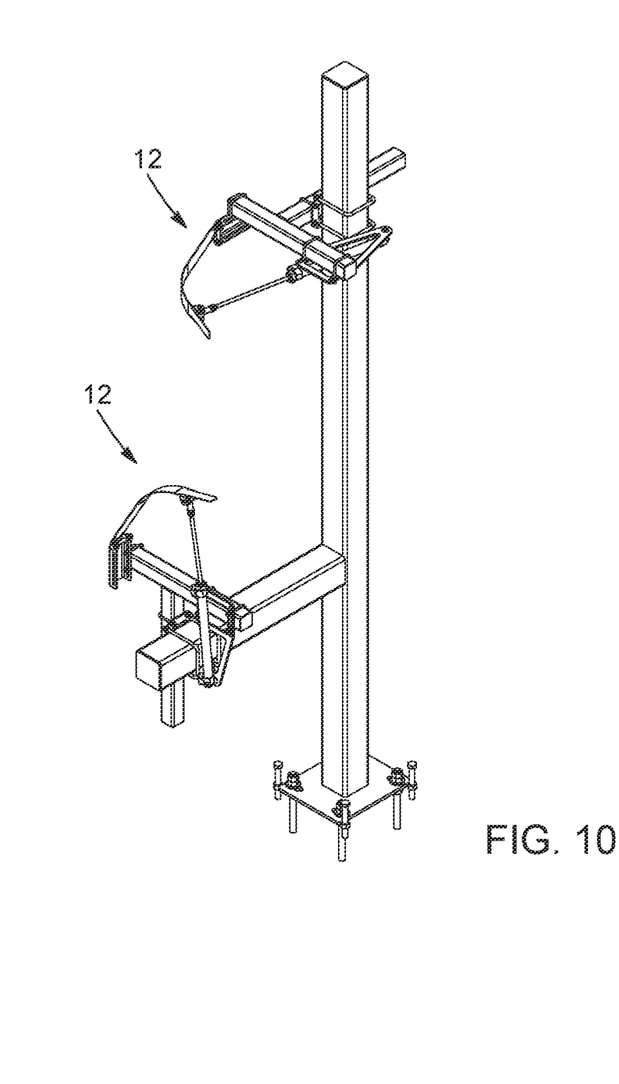
Figure 11:
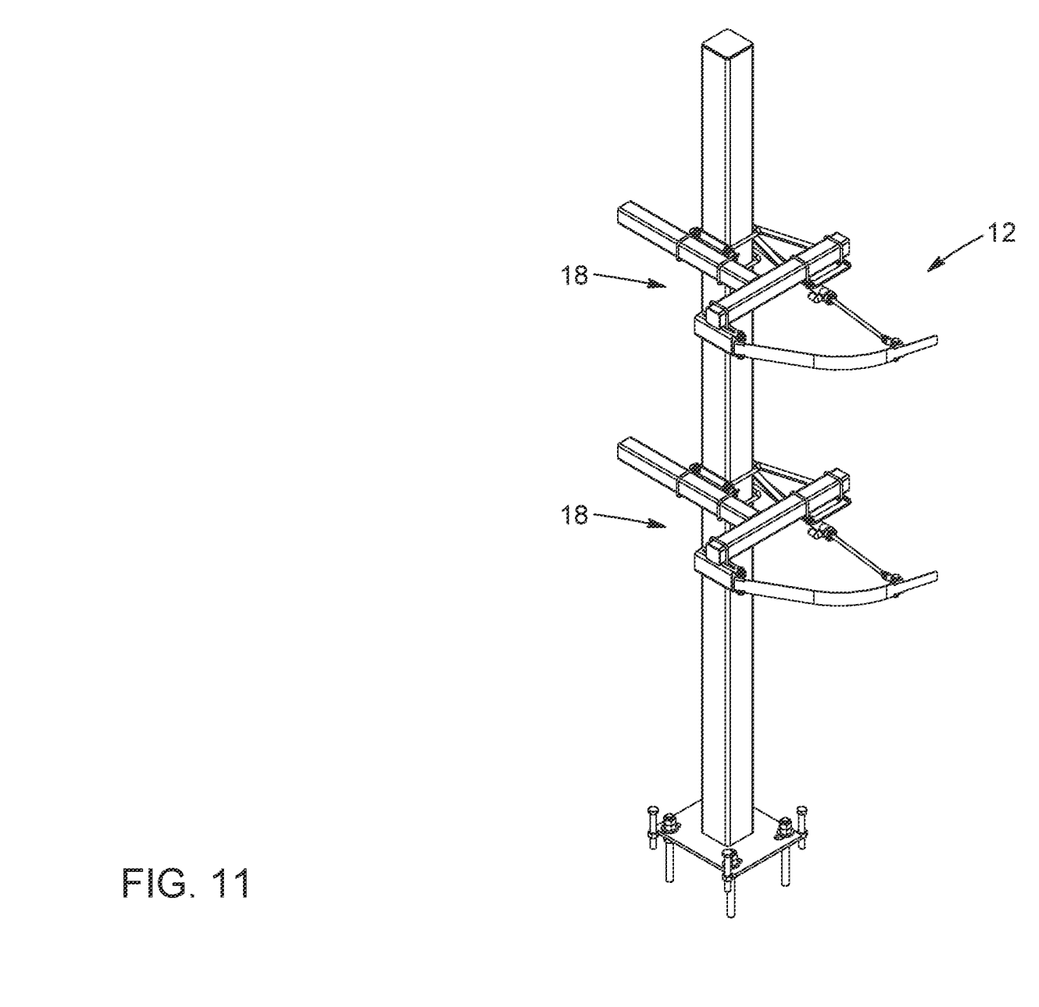
FIG. 11 is a perspective view of a stabilizer according to another embodiment, showing a pair of substantially identical shock absorbers mounted to a same post.

In yet other possible embodiments, the stabilization system could be equipped with automatic cleaning tools that could sterilize the parts that has contact with the carcass. The system can be equipped with a device on the opposite side of the shock absorbers to improve stabilization such as one or more conveyors, round bar(s), rollers/wheels, movable cradles, etc. The system can use different shock absorber designs such as a first with a short curved plate and the second with a longer curved plate, or any other combinations. The system could use dynamically moveable shock absorbing components in order to adjust individual units to carcass geometry. A different embodiment of the system can include shock absorbers mounted under the product in order to stabilize it on a different axis (seen in FIGS. 9 and 10). The system could also use multiple shock absorbers at the same location along the processing line but at different vertical height (e.g., seen in FIGS. 6, 8 and 11). The shock absorbers of one or more stabilizers 12 could be identical (e.g., seen in FIG. 11) or configured differently (e.g., seen in FIGS. 5 and 6) in order to contact and press carcasses at different locations and/or apply varying pressures thereon.

Moreover, in the context of the present description, expressions such as "can", "may", "might", "will", "could", "should", "would", etc., may also be used interchangeably, whenever appropriate, as also apparent to a person skilled in the art.

In the context of the present description, it will be considered that all elongated objects will have an implicit "longitudinal axis" or "centerline", such as the longitudinal axis of shaft for example, or the centerline of a coiled spring, for example, and that expressions such as "connected" and "connectable", or "mounted" and "mountable", may be interchangeable. Similarly, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

Moreover, components of the present system(s) and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

Furthermore, although the various exemplary embodiments described herein may be used in relation with stabilizing an animal carcass, for example, it is understood that it may be used with other types of carcasses, products and/or for other purposes. For this reason, the term "product" as used herein should not be taken as to limit the scope of the present disclosure as being used for animal carcasses in particular.

In the present disclosure, an embodiment is an example or implementation of the stabilization system. The various appearances of "one embodiment," "an embodiment" or "some embodiments" do not necessarily all refer to the same embodiments. Although various features may be described in the context of a single embodiment, the features may also be provided separately or in any suitable combination. Conversely, although the stabilization system may be described herein in the context of separate embodiments for clarity, it may also be implemented in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

In the above description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom.

In addition, although the optional configurations as illustrated in the accompanying drawings comprises various components and although the optional configurations of the stabilization system, and corresponding components, as shown may consist of certain geometrical configurations as explained and illustrated herein, not all of these components and geometries are essential and thus should not be taken in their restrictive sense, i.e. should not be taken as to limit the scope of the present disclosure. It is to be understood that other suitable components and cooperations thereinbetween, as well as other suitable geometrical configurations may be used for the implementation and use of the stabilization system, and corresponding parts, as briefly explained and as can be easily inferred herefrom, without departing from the scope of the disclosure.

The invention claimed is:

1. A carcass stabilization system for a meat processing plant having carcasses transported along a processing line, comprising:
    a stabilizer installed proximate the processing line and comprising a carcass engagement component and a shock absorbing device coupled to the carcass engagement component adapted to absorb at least some of the forces resulting from the carcasses impacting the carcass engagement component; and
    a stabilizing surface extending along the processing line and provided opposite the stabilizer such that the carcasses are transported along the processing line between the stabilizing surface and the stabilizer, where the stabilizer is adapted to engage and bias the carcasses against the stabilizing surface,
    wherein the stabilizer further comprises a support member installed proximate the processing line and configured to uphold and position the carcass engagement component and the shock absorbing device adjacent the processing line, and wherein the support member comprises a post and a support frame operatively connected to the post to enable adjusting at least one of a location and an orientation of the support frame relative to the post, the carcass engagement component and the shock absorbing device being connected to the support frame.

2. The carcass stabilization system of claim 1, wherein the carcass engagement component comprises a plate having an engagement surface against which the carcasses abut, and wherein the shock absorbing device is coupled to the plate opposite the engagement surface.

3. The carcass stabilization system of claim 1, wherein the shock absorbing device comprises a pneumatic cylinder configured to generate a pressure on the plate in order to position the plate in a predetermined position relative to at least one of the stabilizing surface and the carcasses.

4. The carcass stabilization system of claim 3, wherein the pressure is substantially constant.

5. The carcass stabilization system of claim 3, wherein the pneumatic cylinder comprises a pneumatic cylinder rod and a pneumatic cylinder housing, and wherein the pneumatic cylinder rod is adapted to retract within the pneumatic cylinder housing when the forces applied on the carcass engagement component are greater than the pressure generated by the pneumatic cylinder.

6. The carcass stabilization system of claim 5, wherein the pneumatic cylinder rod is configured to extend back out of the pneumatic cylinder housing to apply the pressure on the plate and bias the carcasses against the stabilizing surface.

7. The carcass stabilization system of claim 1, further comprising a secondary stabilizer mounted opposite the stabilizer and having a secondary engagement surface.

8. The carcass stabilization system of claim 7, wherein the stabilizing surface includes the secondary engagement surface.

9. The carcass stabilization system of claim 1, wherein the stabilizing surface comprises a conveyor belt adapted to urge the carcasses in the direction of the processing line.

10. The carcass stabilization system of claim 1, wherein the carcass engagement component includes a plate having a proximal portion connected to and extending from the support frame, and a distal portion extending from the proximal portion to engage the carcasses.

11. The carcass stabilization system of claim 10, wherein the plate is arcuated along at least one of the proximal portion and the distal portion and at least partially extends in a general direction of the processing line.

12. The carcass stabilization system of claim 1, wherein the stabilizer comprises a plurality of carcass engagement components and a plurality of shock absorbing devices installed proximate one another on the support member.

13. The carcass stabilization system of claim 1, wherein the stabilizer is a first stabilizer, and the carcass stabilization system further comprises a second stabilizer installed adjacent the first stabilizer along the processing line, the first and second stabilizers defining a dual-stage stabilization sequence where the first and second stabilizers engage the carcasses simultaneously or in succession.

14. The carcass stabilization system of claim 13, wherein the first and second stabilizers are identical.

15. A stabilization system for a processing plant having products being transported along a processing line, comprising:
a stabilizer installed proximate the processing line and comprising a product engagement component and a shock absorbing device coupled to the product engagement component adapted to absorb at least some of the forces resulting from the products impacting the product engagement component;
a stabilizing surface extending along the processing line and provided opposite the stabilizer such that the products are transported along the processing line between the stabilizing surface and the stabilizer, where the stabilizer is adapted to engage and bias the products against the stabilizing surface; and
wherein the stabilizer further comprises a support member installed proximate the processing line and configured to uphold and position the product engagement component and the shock absorbing device adjacent the processing line, and wherein the support member comprises a post and a support frame operatively connected to the post to enable adjusting at least one of a location and an orientation of the support frame relative to the post, the product engagement component and the shock absorbing device being connected to the support frame.

16. The stabilization system of claim 15, wherein the product is an animal carcass.

17. A stabilization system for products being transported along a processing line, comprising:
a stabilizer installed proximate the processing line and comprising a product engagement component, the stabilizer being adapted to absorb at least some of the forces resulting from the products impacting the product engagement component;
a stabilizing surface extending along the processing line and provided opposite the stabilizer such that the products are transported along the processing line between the stabilizing surface and the stabilizer, where the stabilizer is adapted to engage and bias the products toward the stabilizing surface; and
wherein the stabilizer further comprises a support member installed proximate the processing line and configured to uphold and position the product engagement component adjacent the processing line, and wherein the support member comprises a post and a support frame operatively connected to the post to enable adjusting at least one of a location and an orientation of the support frame relative to the post, the product engagement component being connected to the support frame.

* * * * *